United States Patent [19]
Colombo et al.

[11] Patent Number: 5,944,478
[45] Date of Patent: Aug. 31, 1999

[54] AUTOMATIC STACKER WITH ROTARY HEADS FOR STACKING, IN AN ORDERED MANNER IN ALTERNATE UPRIGHT AND INVERTED LAYERS, METAL SECTIONS ORIGINATING FROM A ROLLING MILL

[75] Inventors: Ezio Colombo; Marco Rossini, both of Castellanza, Italy

[73] Assignee: Techint Compagnia Tecnica Internazionale S.p.A., Milan, Italy

[21] Appl. No.: 08/891,029

[22] Filed: Jul. 10, 1997

[30]     Foreign Application Priority Data

Jul. 10, 1996  [IT]  Italy ................................ MI96/A1422

[51] Int. Cl.⁶ .................................................. B65G 57/18
[52] U.S. Cl. .................... 414/788.3; 414/742; 414/791.4
[58] Field of Search ..................... 414/737, 742, 414/743, 788.3, 791.4, 793.2

[56]             References Cited

U.S. PATENT DOCUMENTS 4,057,150  11/1977  Lunden .
4,184,800   1/1980  Uchida et al. ........................ 414/791.4
4,648,770   3/1987  Berz et al. ......................... 414/791.4 X
4,969,313  11/1990  Nonini et al ...................... 414/791.4 X
5,001,890   3/1991  Mansutti ........................... 414/791.4 X

FOREIGN PATENT DOCUMENTS 0 099863   2/1984   European Pat. Off. .
0 196685  10/1986   European Pat. Off. .
0 318 722  6/1989   European Pat. Off. .
  1446613  6/1966   France .

*Primary Examiner*—Janice L. Krizek
*Attorney, Agent, or Firm*—Oblon, Spivak, McClelland, Maier & Neustadt, P.C.

[57]             ABSTRACT

An automatic stacker with rotary heads for stacking in an ordered manner in alternate upright and inverted layers rolled metal sections originating from a rolling mill via a transport line is characterised in that each head also undergoes vertical translational movement in the directions of the arrow substantially parallel to itself, such movement being provided by a second drive mechanism independent of a first providing rotation of the head itself. In this manner, the head deposits softly and with precision each layer of sections on the layer placed below, thus avoiding jamming and improper stacking.

7 Claims, 19 Drawing Sheets

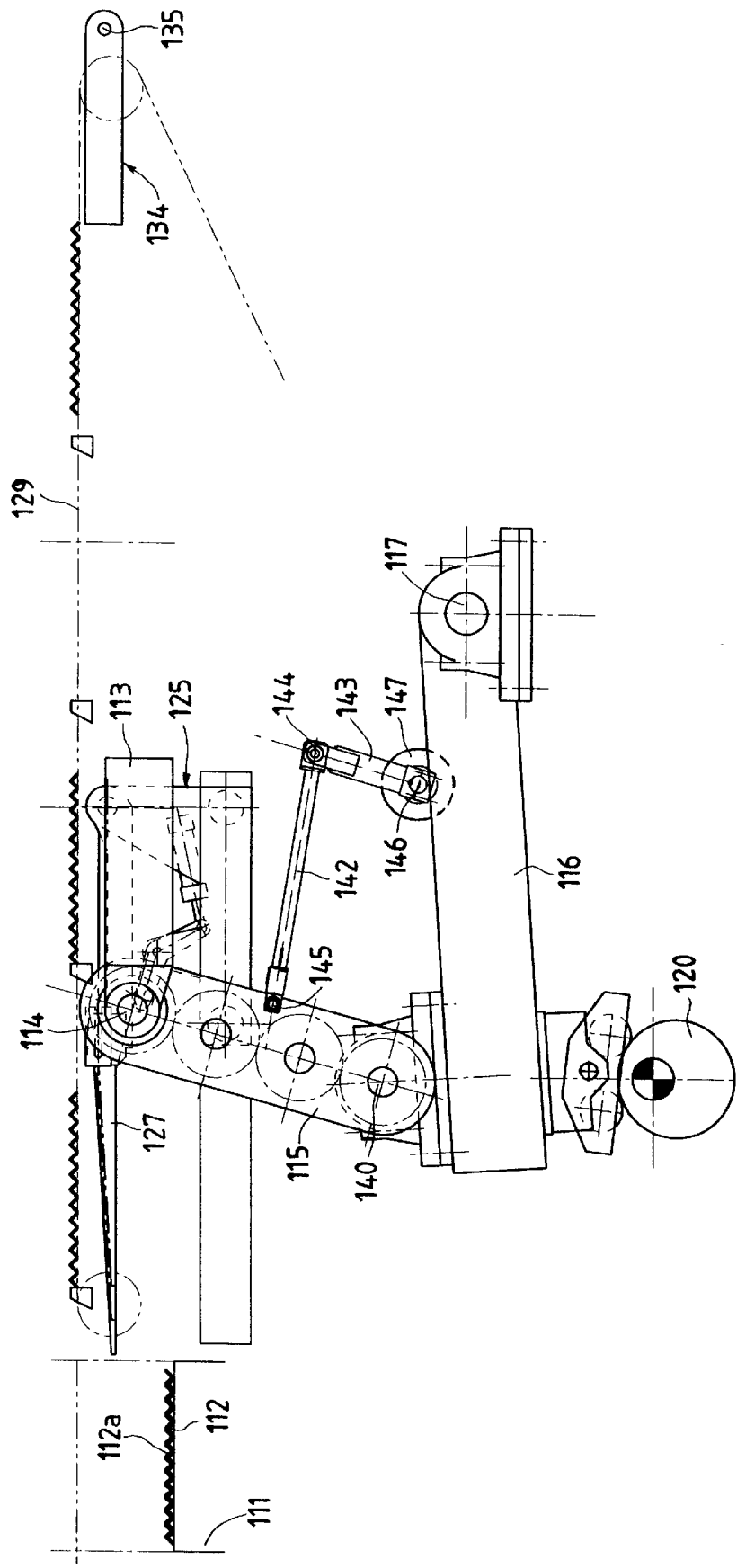

AUTOMATIC STACKER WITH ROTARY HEADS FOR STACKING, IN AN ORDERED MANNER IN ALTERNATE UPRIGHT AND INVERTED LAYERS, METAL SECTIONS ORIGINATING FROM A ROLLING MILL

BACKGROUND OF THE INVENTION

1. Field of the Invention

This invention relates to an automatic stacker with mechanical or magnetic heads, which is able to stack in an ordered manner in alternate upright and inverted layers rolled metal sections cut to commercial length.

2. Discussion of the Background

Automatic stackers of the aforesaid type are well known to the expert of the art, for example from EP 0099863, EP 0196685 and EP 0318722.

In these stackers the rotary heads, for example magnetic, withdraw an ordered layer of sections from a transport system and position it inverted on a layer of sections previously deposited in an upright position, on a descending platform provided in a forming region for the stack to be packed.

Generally the rotary heads cooperate with to-and-fro moving carriages provided with lances to withdraw from said transport system, alternately with the magnetic heads, those layers of sections to be deposited on the descending platform in an upright position.

In these known stackers, the rotary heads are rotated by complex, costly linkages which, being of rigid geometry, are able to cause the magnetic heads to approach to within only a certain distance from the top of the last layer of sections deposited on the descending platform, from which distance the layer of sections is allowed to drop by demagnetizing the magnetic heads and with the aid of expulsion means.

Dropping of the layer of sections from a certain distance can result in their disordered stacking, and hence a badly made pack, which must be prevented for evident commercial reasons.

In addition, a disordered top layer of sections can interfere with the magnetic head movement, with consequent breakage, jamming and machine stoppage.

Precisely to avoid said interference, the movement path of the magnetic heads is maintained at a certain distance from the top of the lastly deposited layer on the descending platform, but with said risk of depositing the sections in an imperfectly ordered manner. In addition, the movement of the head carrying a layer of inverted sections towards the layer of upright sections already deposited in the stack formation region takes place along an axis which is not perfectly perpendicular to the plane in which the layer of upright sections lies, this not facilitating the nesting of those sections having more difficultly stackable shapes.

Stackers of a known type also occupy a considerable space above the section transport line, making the operating region difficultly accessible, both from above and laterally (see for example IT 1247451).

Finally, the complexity of the linkages driving the rotary heads means that a multiplicity of manoeuvres are required, leading to a too lengthy stacking time, incompatible with the continuously increasing productivity of modern rolling mills.

SUMMARY OF THE INVENTION

The general object of the present invention is to obviate the aforesaid drawbacks of the known art by providing a rotary head stacker able to deposit gently, and in a short time, an inverted layer of sections on a previously deposited upright layer, so as to prevent disordered section stacking, and hence a badly made pack, and the danger or interference with the moving head. A further object of the invention is to provide a stacker comprising a rotary head maneuvring system which is structurally simple and hence economical, and occupies no space above or to the side of the section transport line.

These objects are attained by a stacker having the characteristics defined in the accompanying claims.

BRIEF DESCRIPTION OF THE DRAWINGS

The structural and operational characteristics of the invention and its advantages over the known art will be more apparent from an examination of the description given hereinafter with reference to the accompanying schematic drawings, in which:

FIGS. 1 to 12 show in succession the various operating stages of two different methods of operation of a stacker formed in accordance with the inventive principle, while FIGS. 13 to 19 show a further possible embodiment of the invention. In the drawings:

FIGS. 1 to 6 are schematic vertical sections showing a first method of operation of a stacker according to the invention;

FIGS. 7 to 12 are views similar to FIGS. 1 to 6, but showing a second method of operation of the same stacker; and FIGS. 13 to 19 are schematic vertical sections illustrating a further possible embodiment of a stacker according to the invention.

DESCRIPTION OF THE PREFERRED EMBODIMENTS

Figure 1:
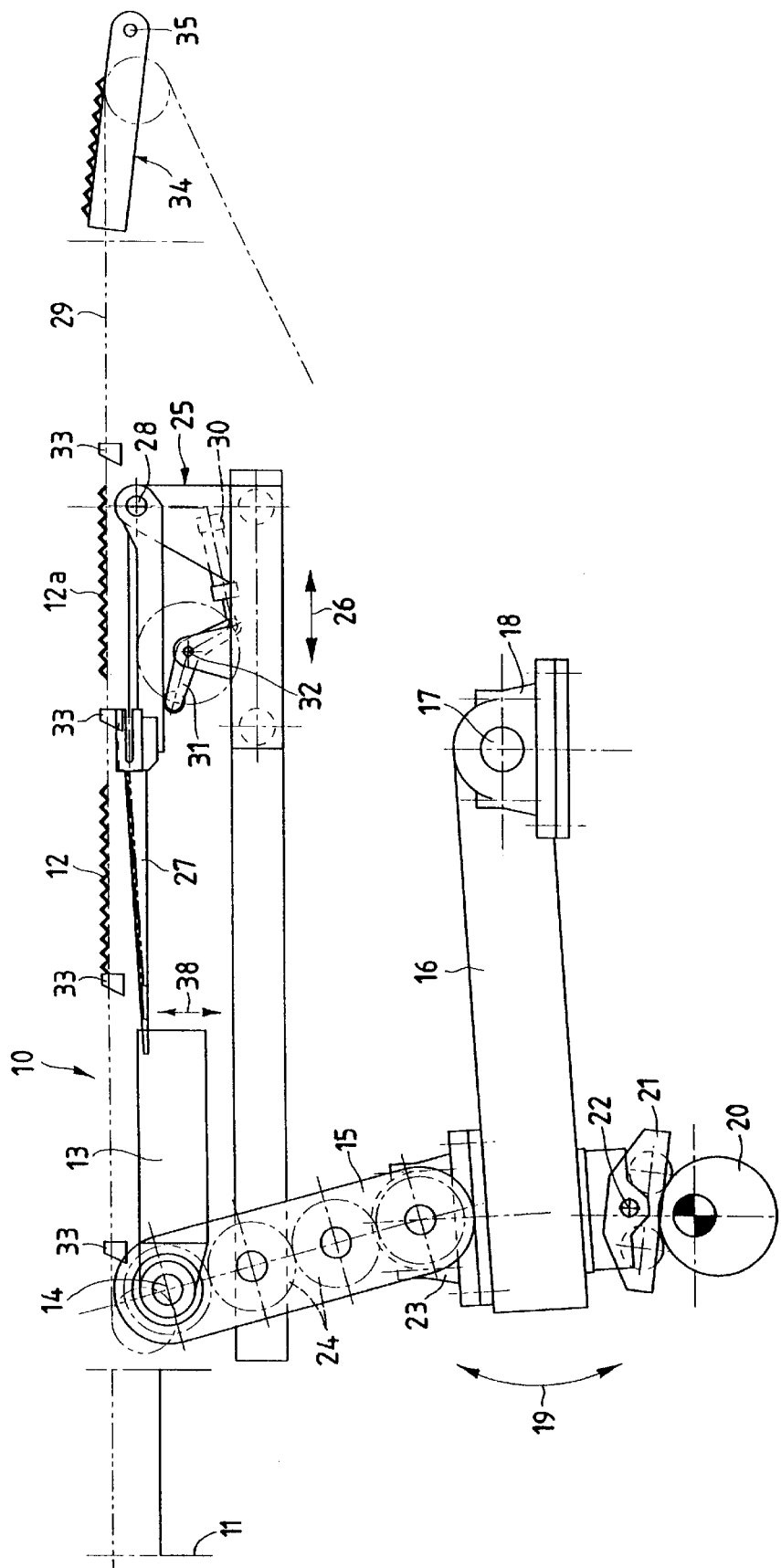
Figure 2:
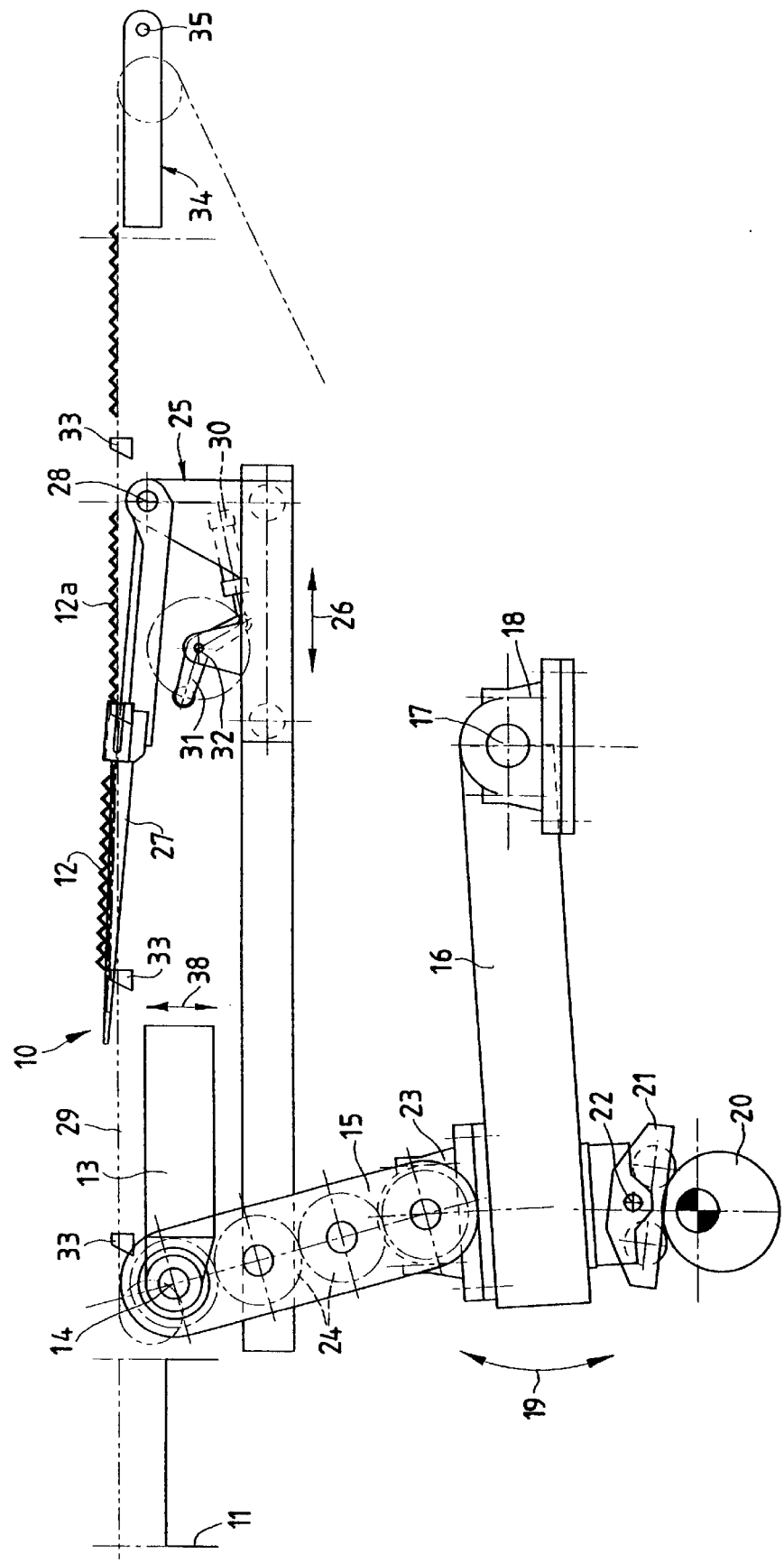
Figure 3:
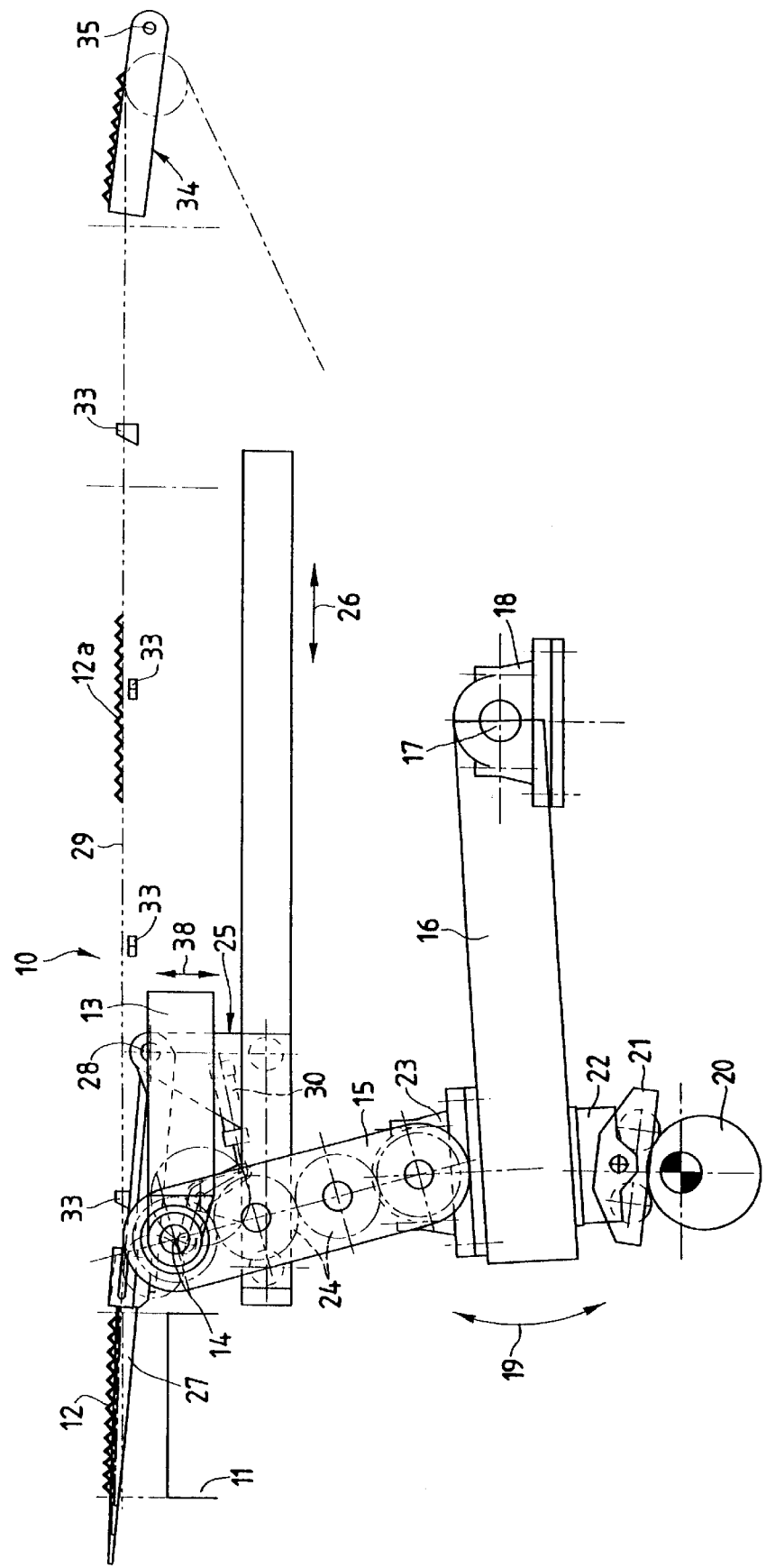

In FIGS. 1–12, the reference numeral 10 indicates overall a stacker according to the invention arranged to stack, on a descending platform 11, a plurality of superposed layers 12 of sections originating from a rolling mill and cut to commercial length.

The stacker according to the invention is formed structurally from a plurality of side-by-side heads 13, of a known type, each of which is pivoted at 14 to one end of an arm 15. The head 13 can be of either a mechanical or magnetic type.

The arm 15 is fixed, at the opposite end to 14, to the free end of a lever 16 the opposite end of which is pivoted at 17 to a support 18.

The arm 15 can be fixed directly on and project from the lever 16, or can be pivoted to the latter and supported laterally by guides (not shown).

The lever 16 is caused to rotate about a hinge member 17 in the directions of the arrow 19 by a motorized cam 20 via a cam follower 21 floating about hinge 22, so as to cause the head 13 to move vertically substantially parallel to itself, in the directions of the arrow 38.

Figure 5:
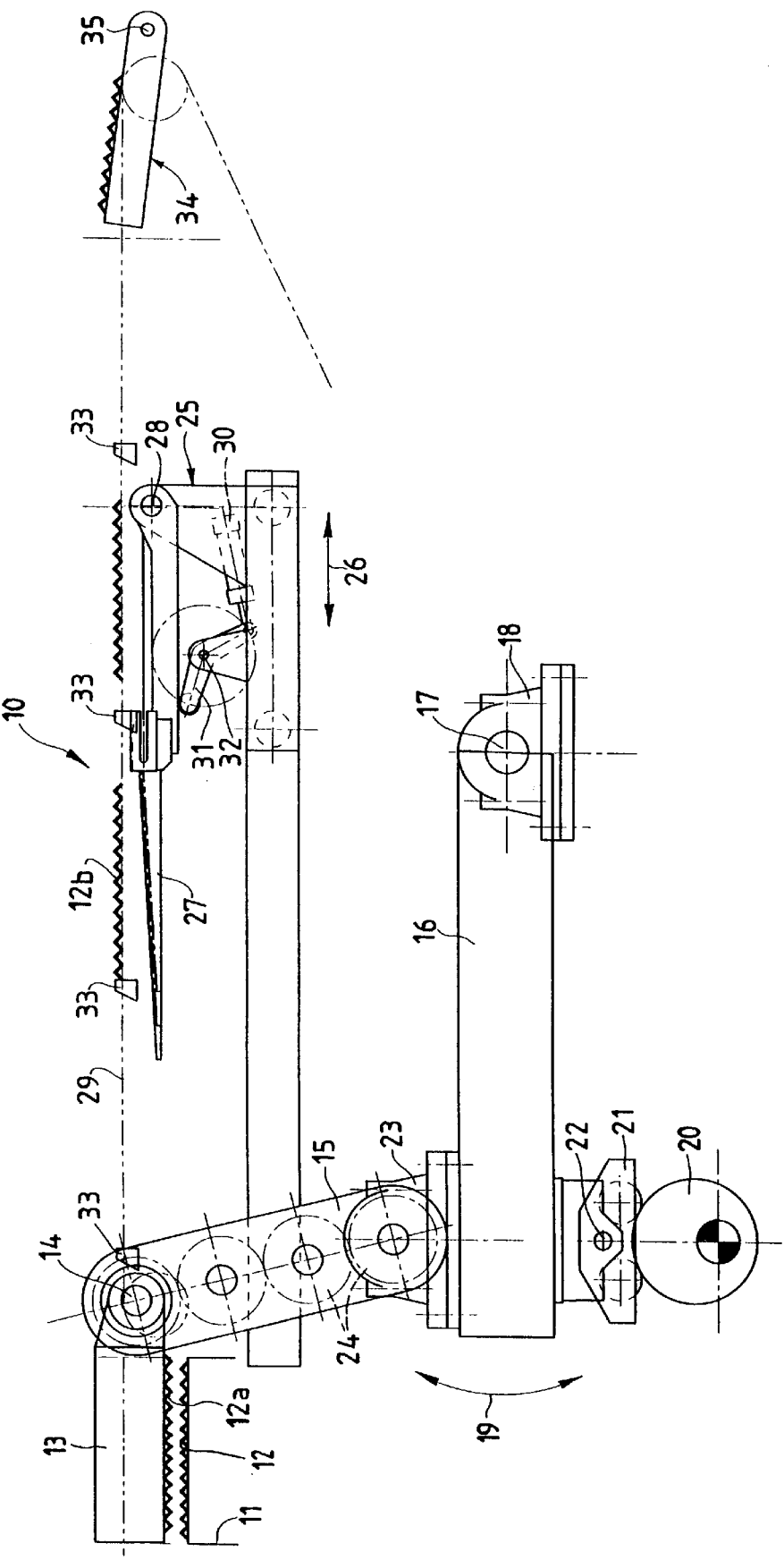

The head 13 can be rotated through 180° from the position shown in FIG. 1 to the position shown in FIG. 5, and vice versa, by a geared motor unit 23, indicated schematically, via a linkage consisting of a plurality of mutually engaged gearwheels 24.

Other drive systems of different types can however, be used. With the magnetizable head 13 there cooperates a carriage 25 driven in the directions of the arrow 26 and carrying a lance 27 which rotates about hinge 28 and is arranged to withdraw the layers 12 from the transport line 29 indicated schematically.

The lance 27 is made to rotate about hinge 28 by an actuator 30 via a lever 31 rotating about hinge 32.

Lowerabie pawls 33 determine the formation of the layers 12 of sections along the transport line 29, by halting them and/or allowing them to advance.

Reference numeral 34 indicates a table rotating about hinge 35, for parking the sections 12 originating from the rolling mill.

Figure 4:
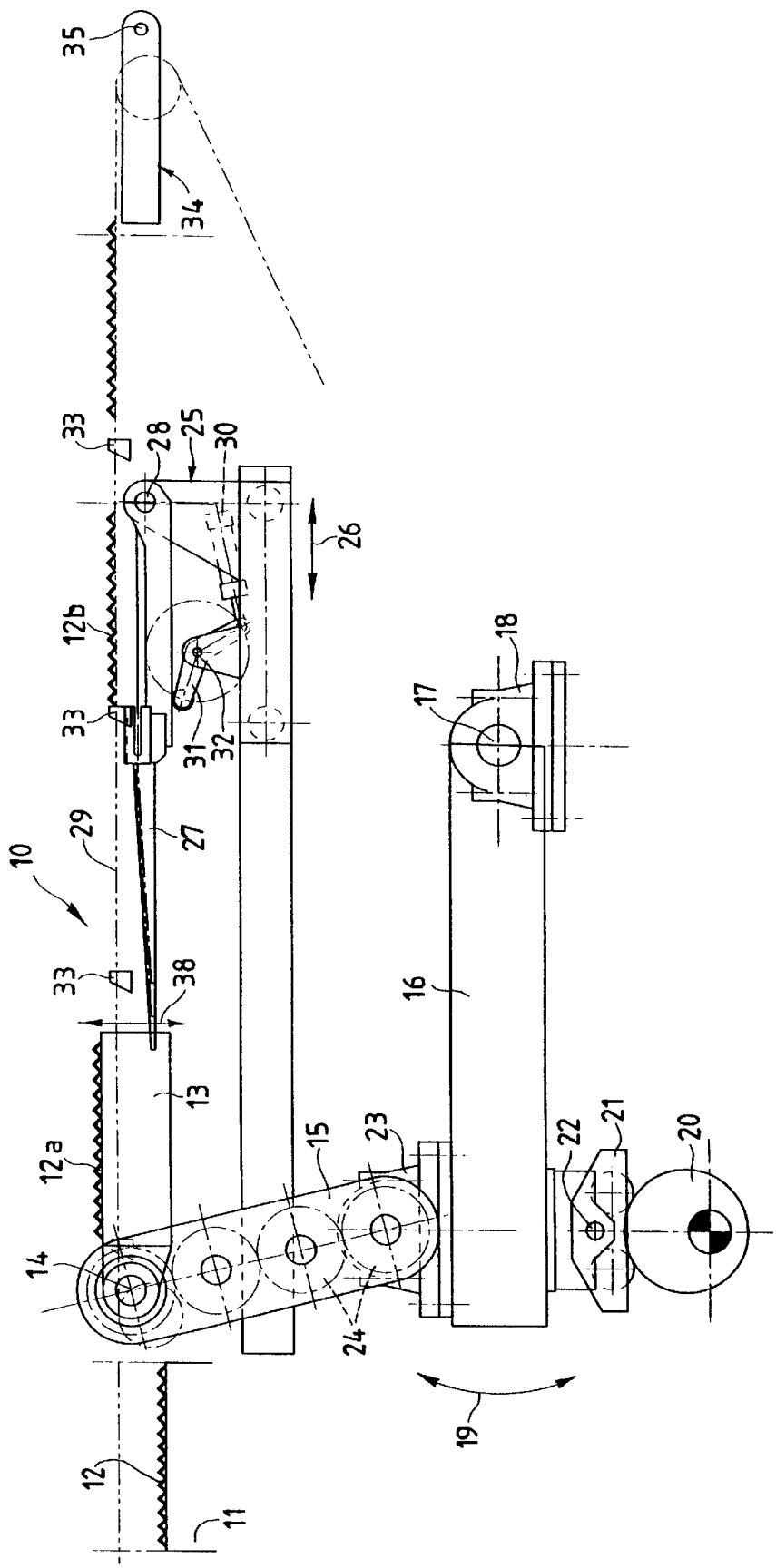
Figure 6:
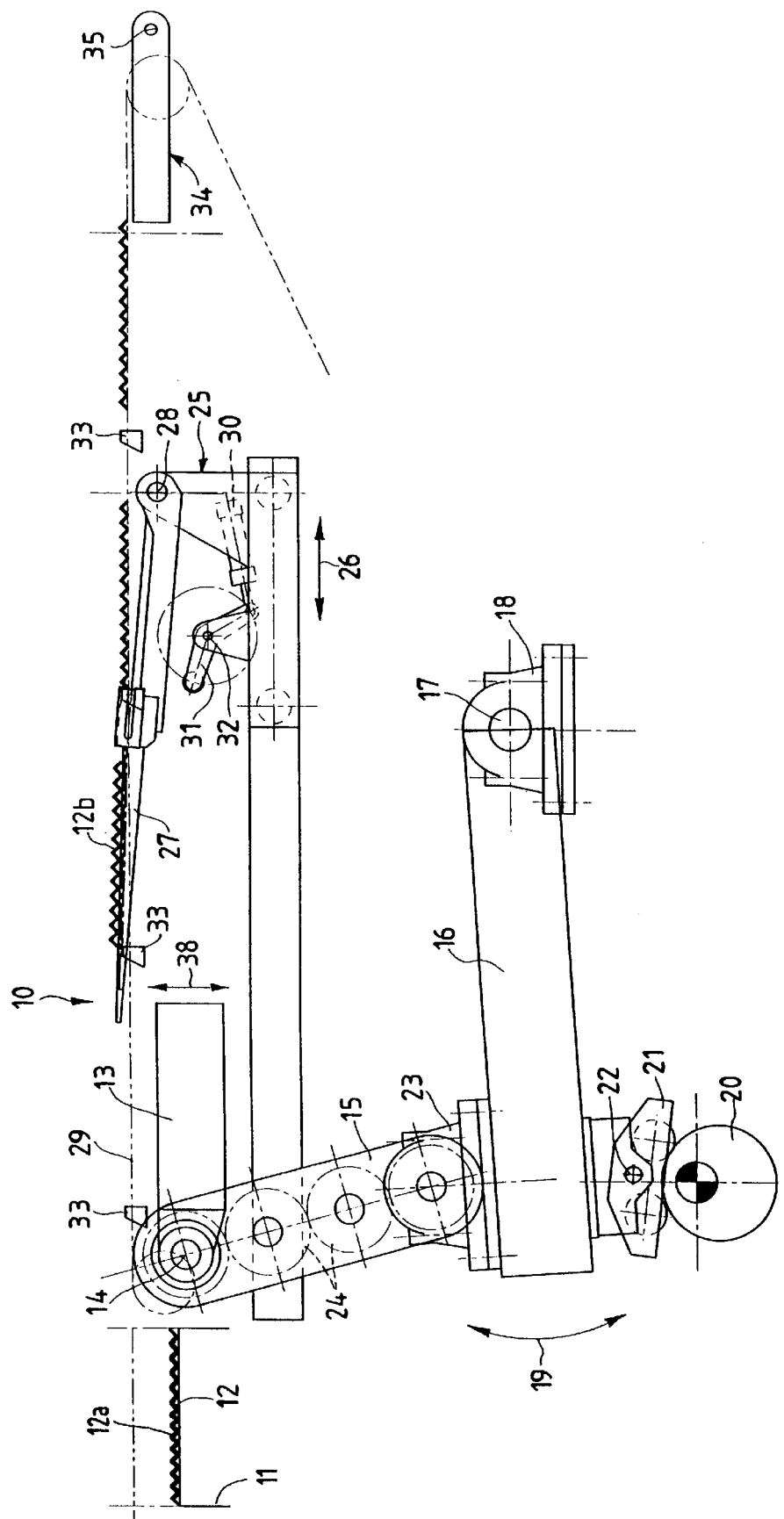
Figure 7:
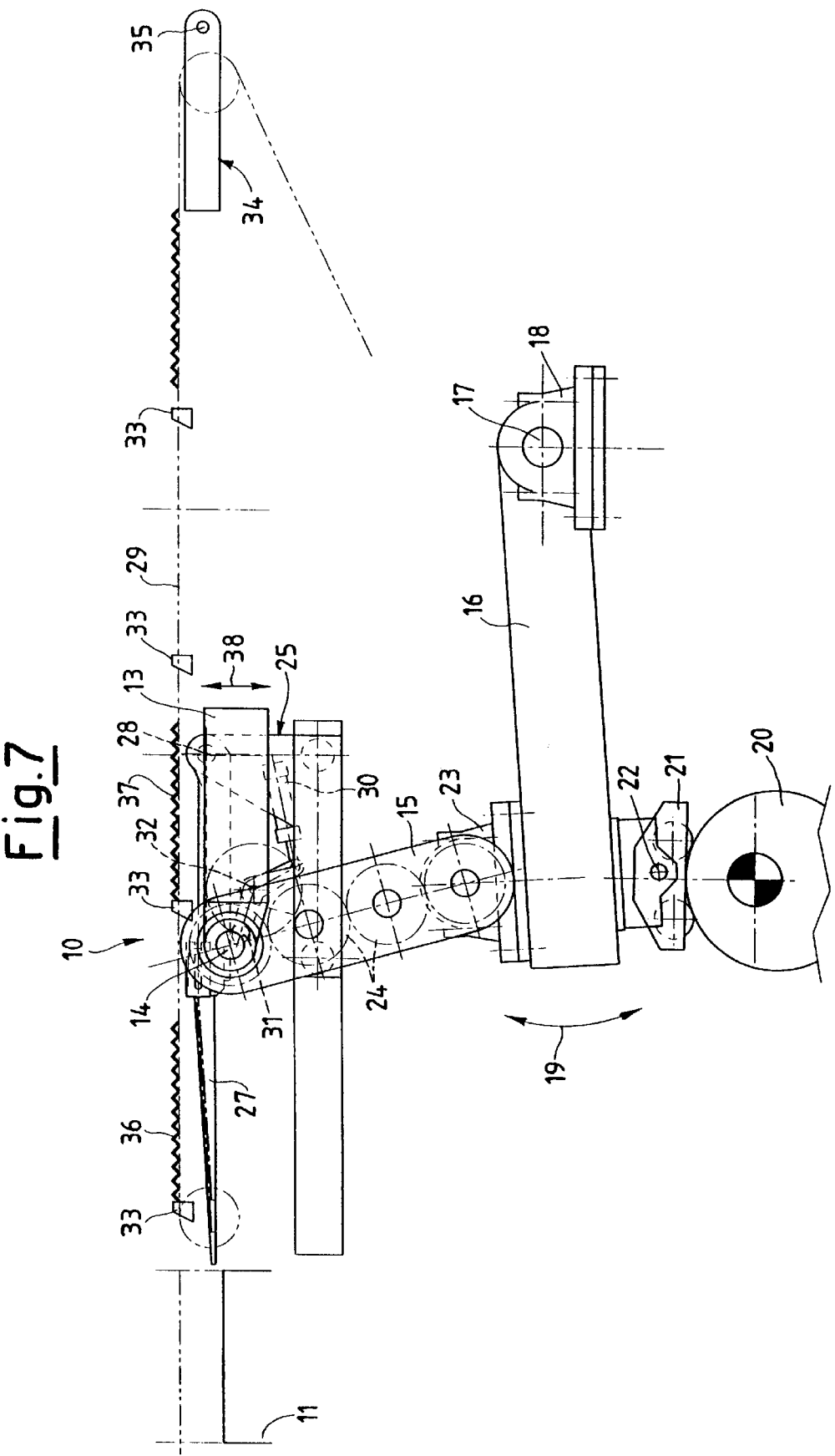

With reference to FIGS. 1–6 of the drawings, in a first method of operation the stacker of the invention withdraws the first layer 12 of sections on the transport line 29 by rotating the lance 27 (from the position shown in FIG. 1 to the position shown in FIG. 2) and conveys it by advancing the carriage 25 (from the position of FIG. 1 to the position of FIG. 3) to above the descending platform 11, on the top of which the layer 12 is rested by lowering the lance 27. The lowered lance returns from the position shown in FIG. 3 to its original position (as shown in FIG. 4) and the magnetized head 13 (driven by the cam 20, via the lever 16 and arm 15, to move vertically upwards in the direction of the arrow 38 parallel to itself) withdraws the second layer 12a of the sections which has been formed on the transport line 29 and inverts it (by counter-clockwise rotation, as shown in FIG. 5, provided by the geared motor 23 via the gearwheels 24) above the first layer 12, to deposit it thereon by demagnetizing the head 13 and with the possible aid of expellers of a known type. After this, the head returns to its original position (as shown in FIG. 6), the lance 27 having already withdrawn a third layer 12b of sections to repeat the described operational stage, and so on until the desired stack has been formed, which is then packaged in a known manner.

The structural and operational simplicity of the separate linkages which control in correct sequence the vertical movement of the head 13 in the directions of the arrow 38 and its rotation should be noted, by which the layers 12 of sections from the transport system 29 can be inverted and brought perfectly above the last layer arranged on the descending platform 11 and deposited there by a movement along an axis perfectly perpendicular to the plane on which said layers lie, so thus facilitating correct stacking of sections of the most various configurations, even those which are difficult to nest together.

With reference to FIGS. 7 to 12, the stacker of the invention can also operate in such a manner as to transfer two layers 12 of sections at a time from the transport line 29 to the descending platform 11.

Figure 8:
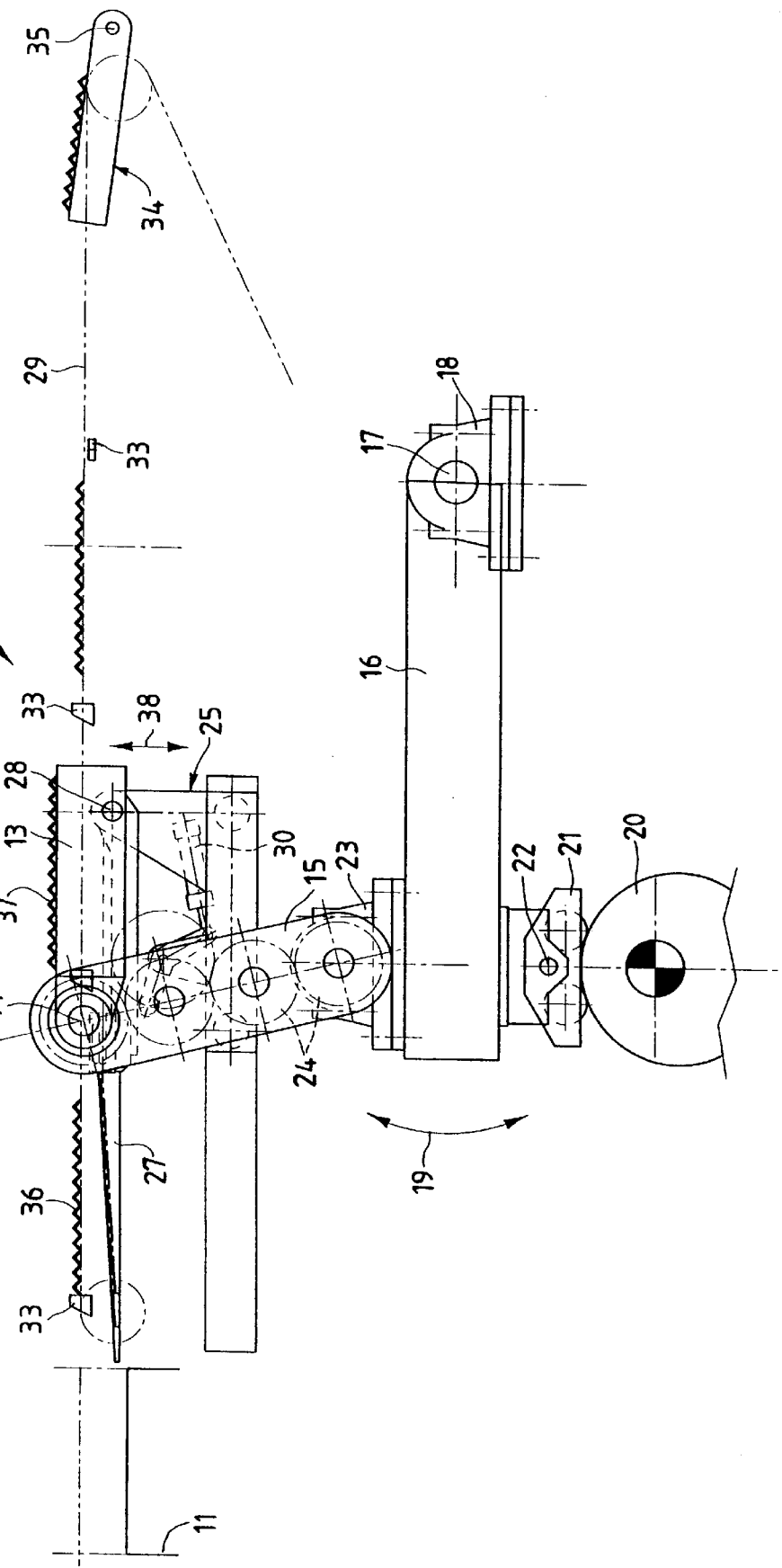
Figure 9:
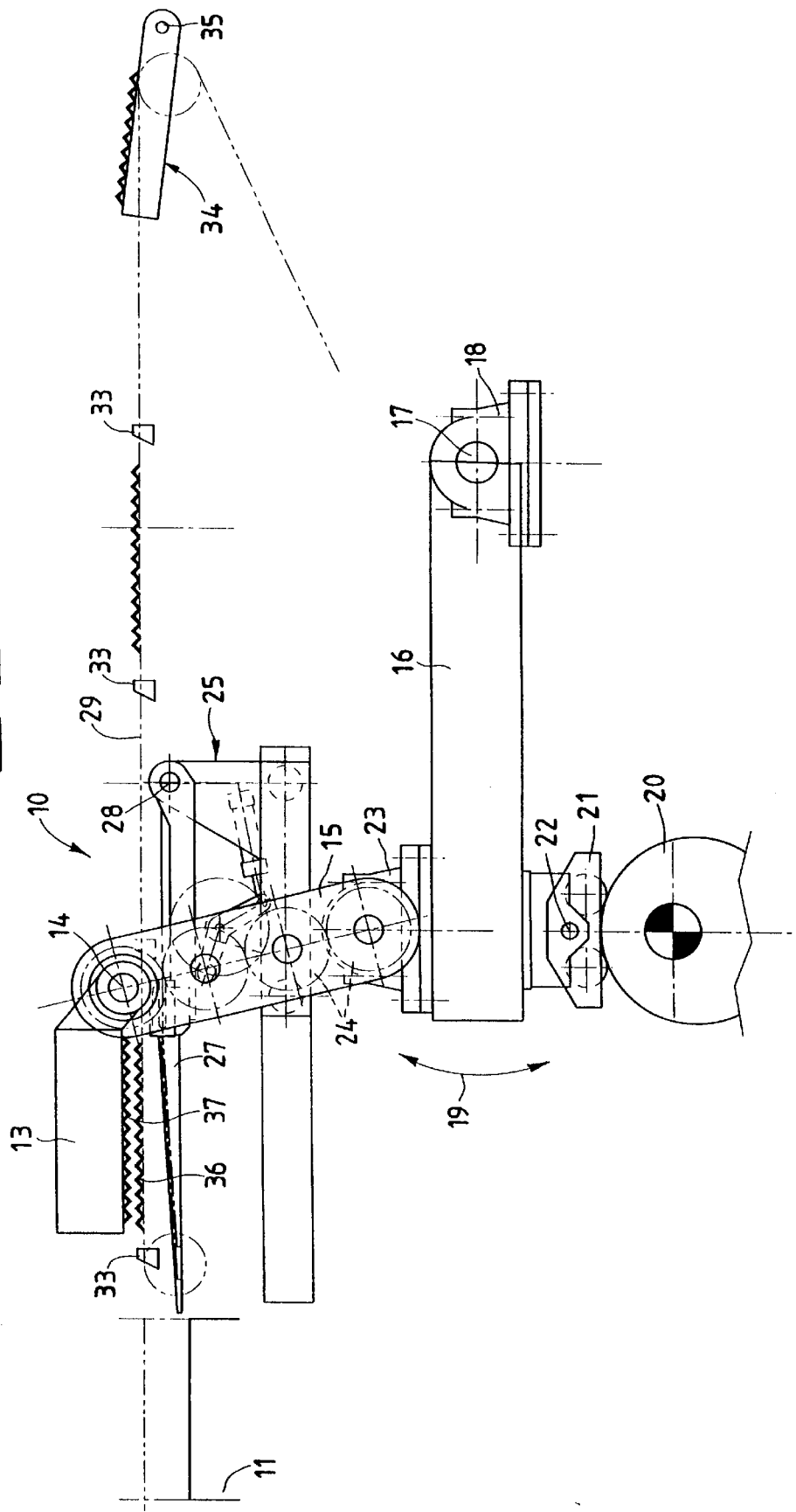
Figure 10:
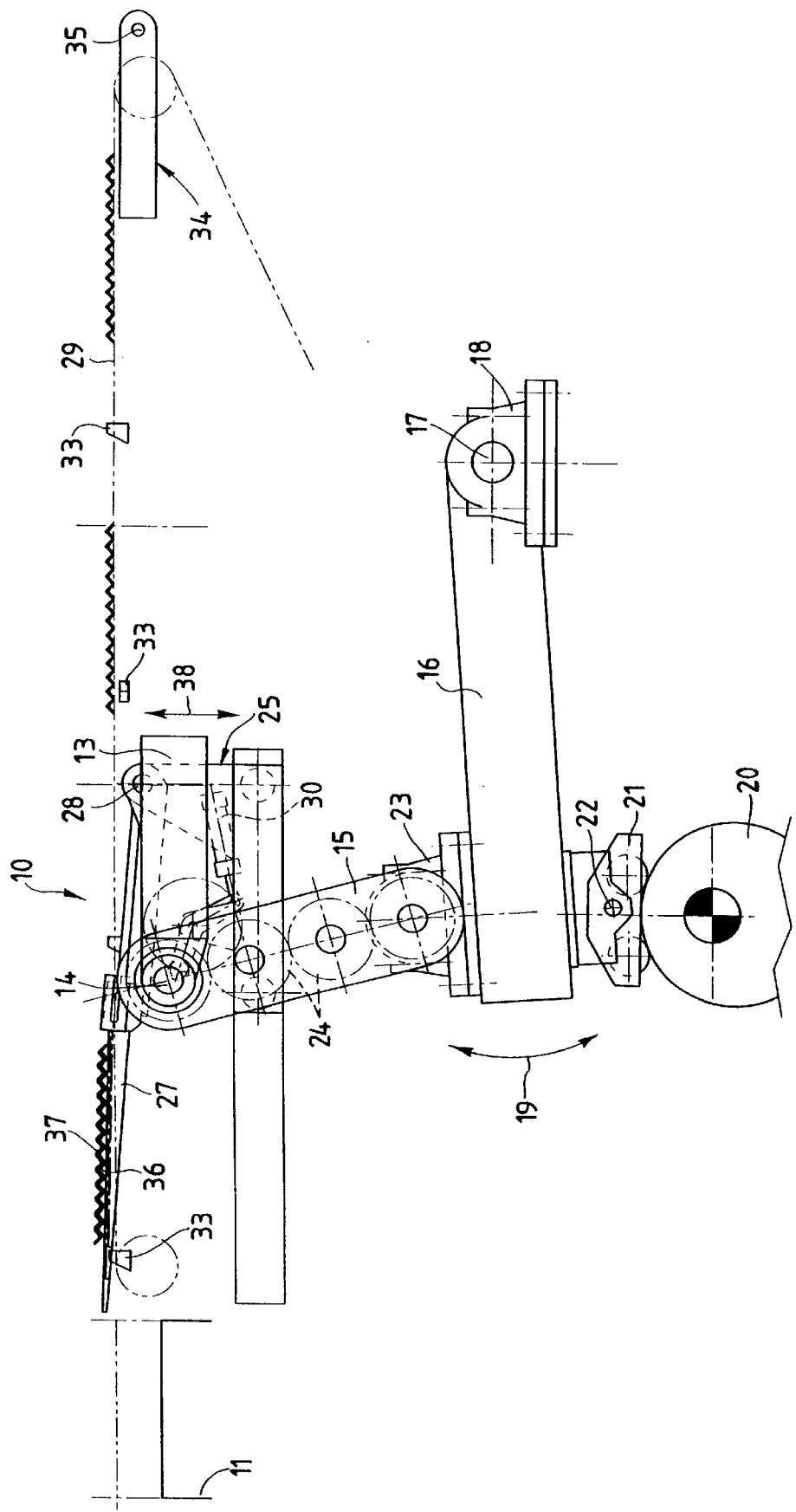
Figure 11:
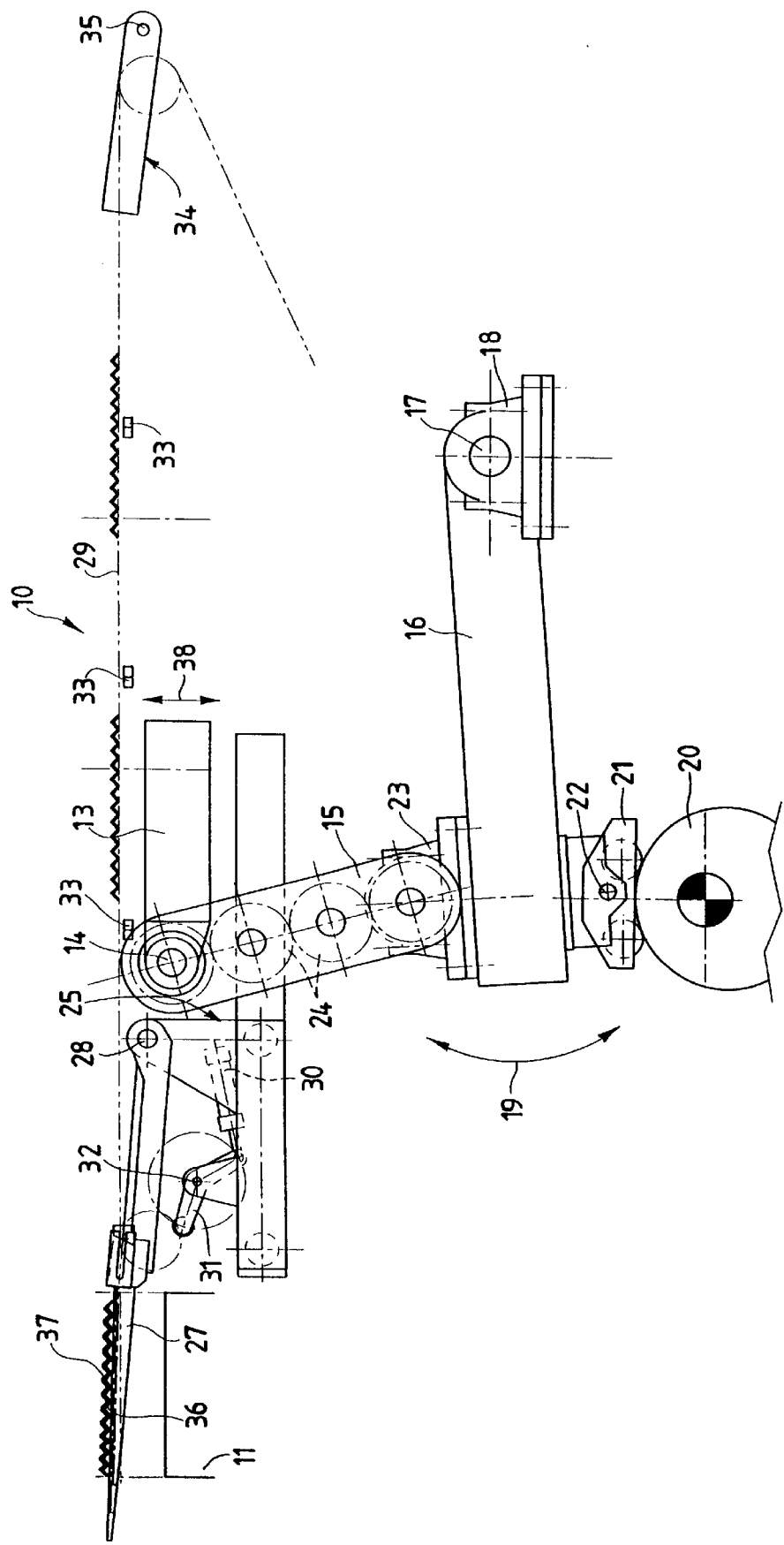
Figure 12:
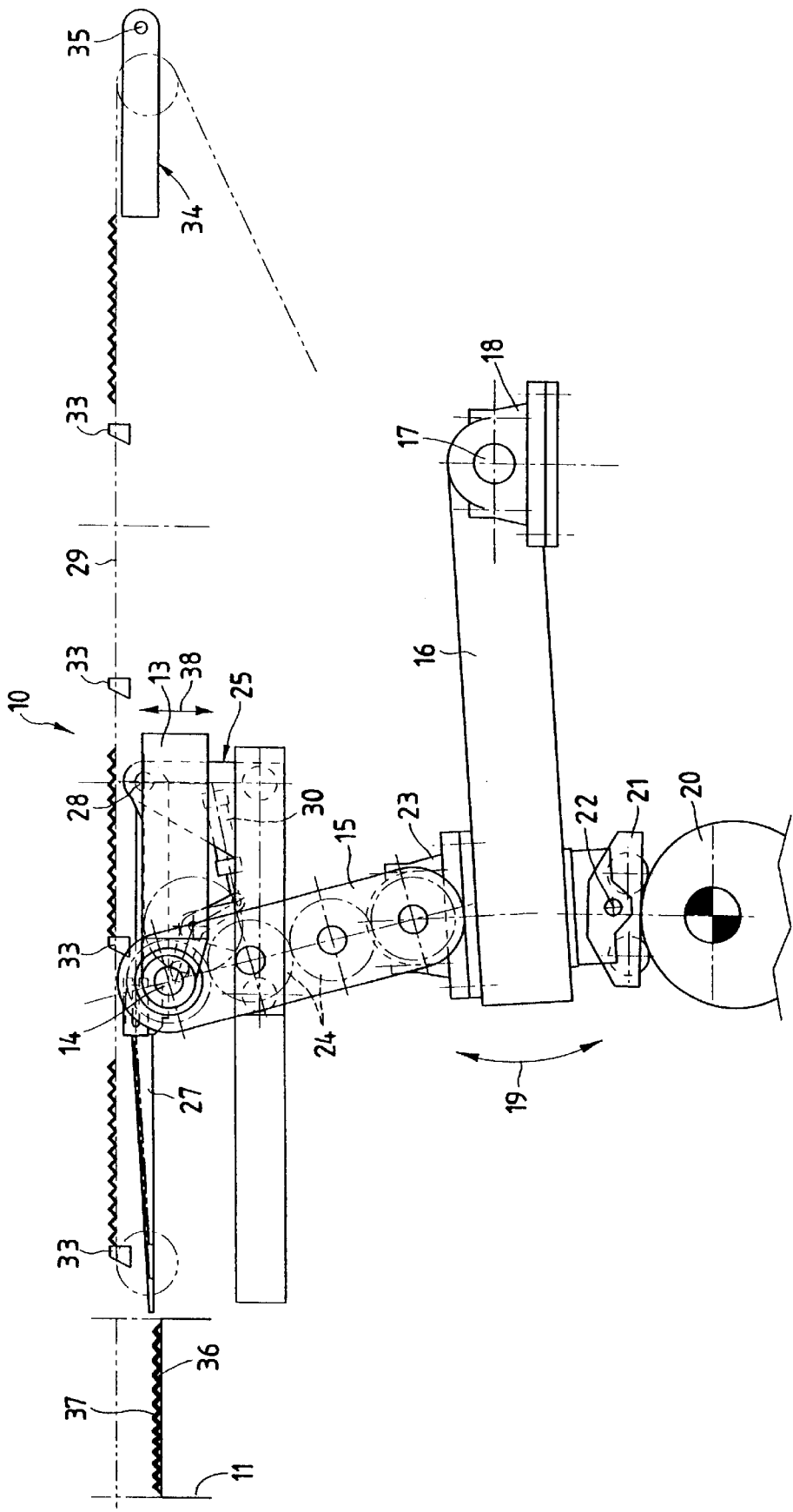

In this method of operation, a first layer 36 of sections is formed at the end of the transport line 29 and a second layer 37 is overturned onto said first layer 36 by the magnetic head 13, in accordance with the sequence shown in FIGS. 8 and 9. After this, the head 13 returns to its original position whereas, as shown in FIG. 10, the lance 27 withdraws the two layers 36, 37 and by a translational movement (FIG. 11) followed by lowering (FIG. 12), deposits both the layers onto the top of the descending platform 11.

FIGS. 13–19 show a further possible embodiment of the invention. in which the components equal and/or equivalent to those already described with reference to FIGS. 1–12 carry the same reference numerals plus 100.

Figure 13:
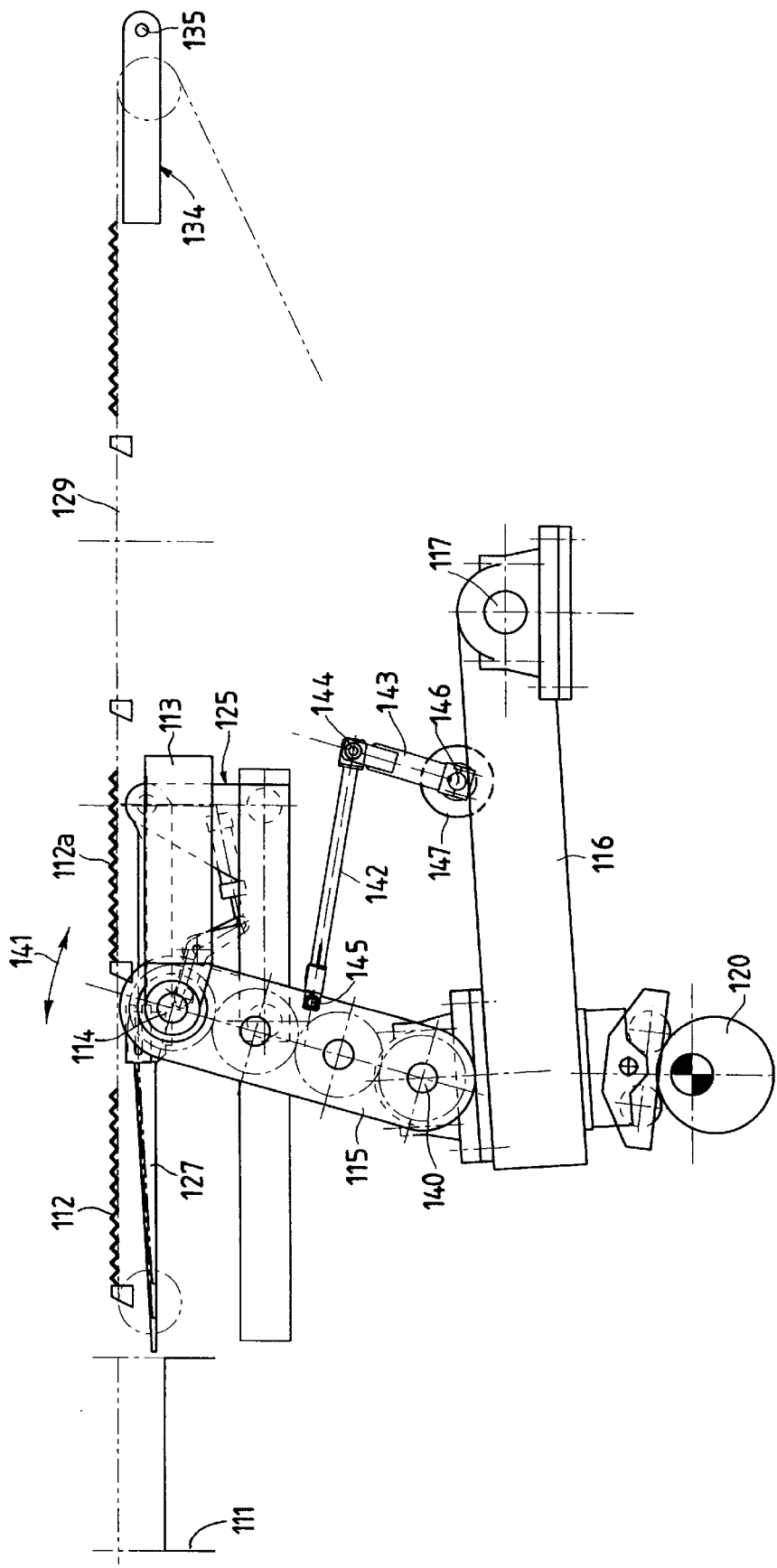
Figure 16:
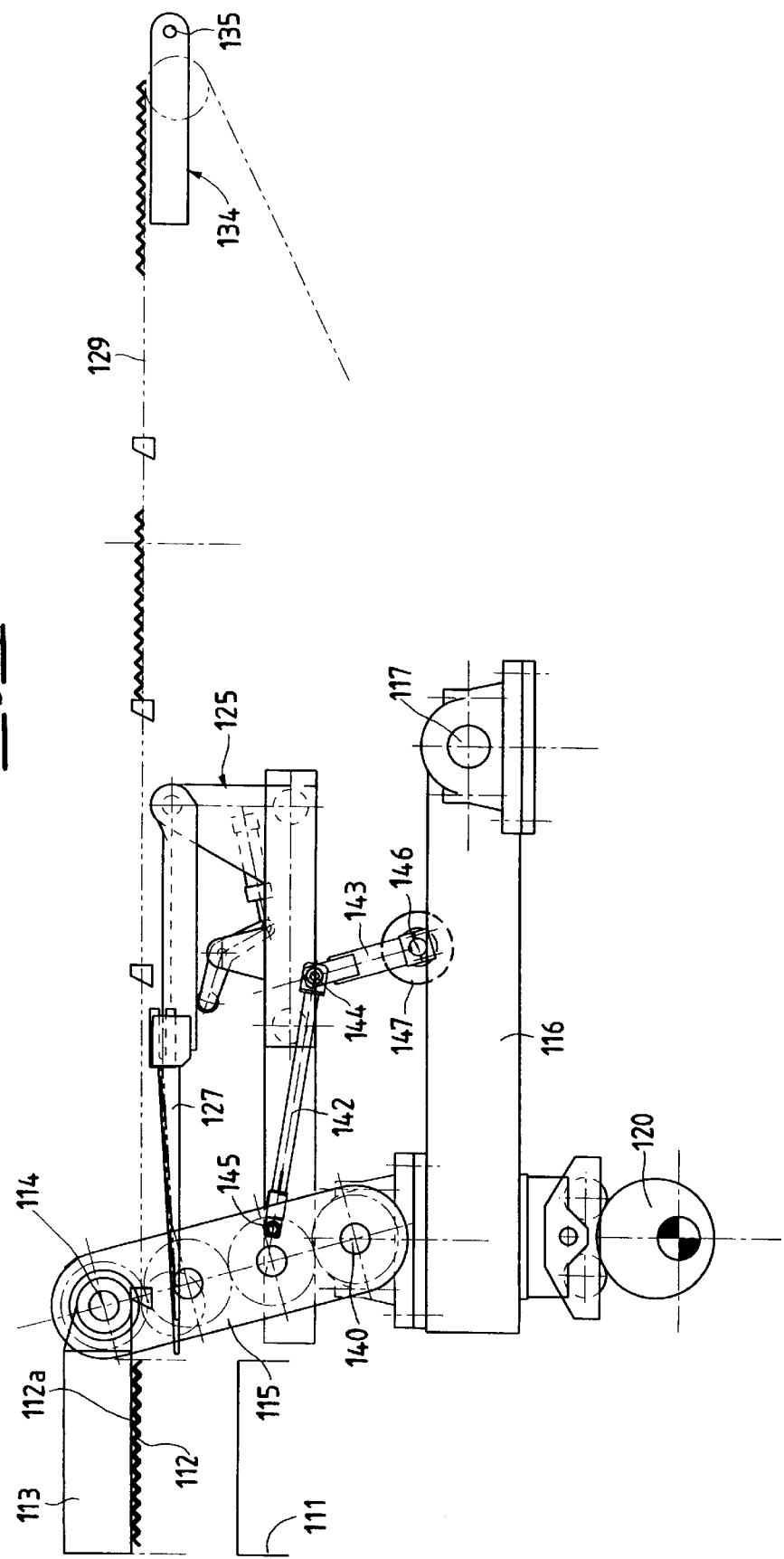
Figure 17:
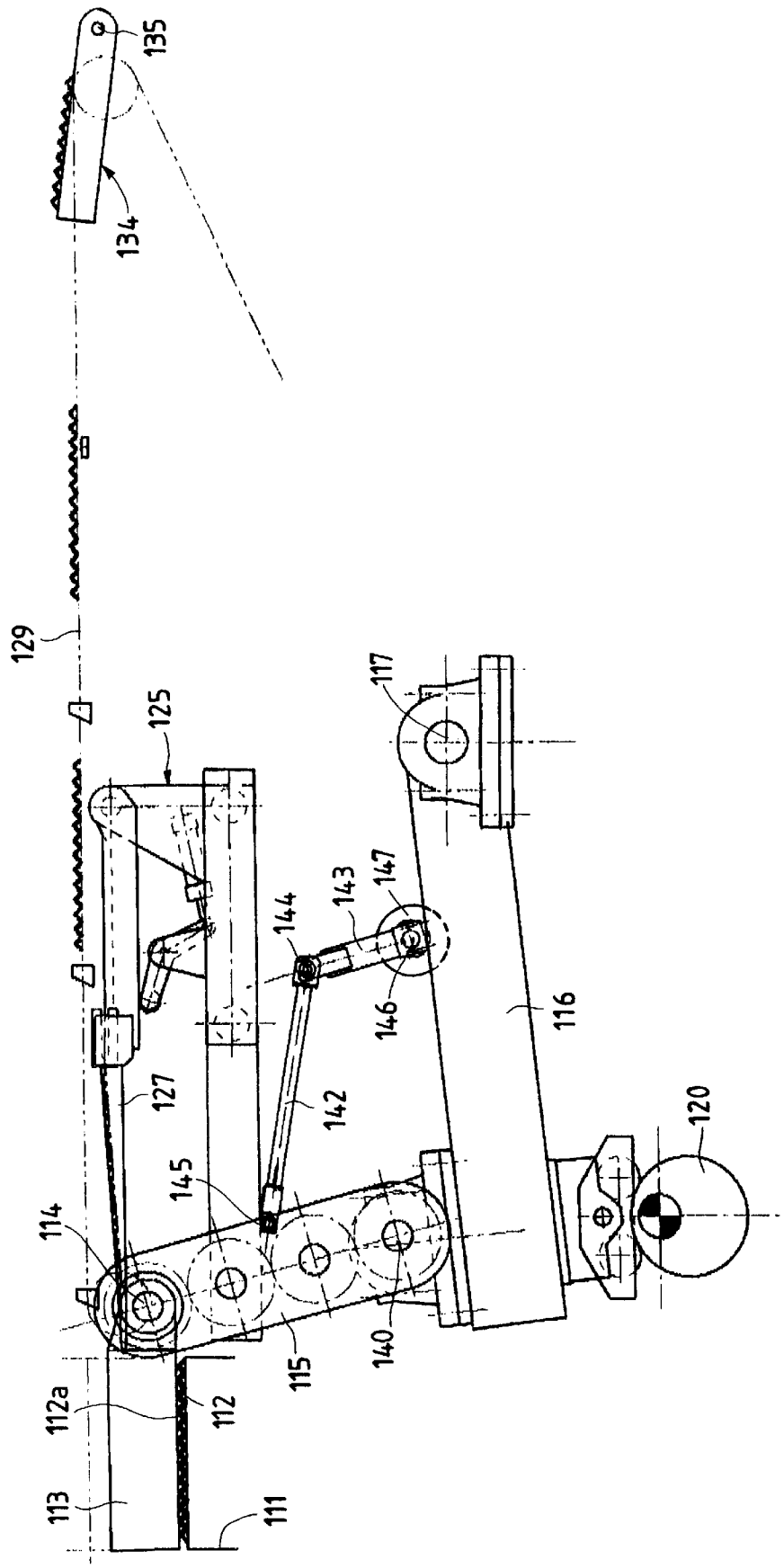

In this further embodiment, the arm 115 is pivoted at 140 to the lever 116 so as to be able to be rotated in the directions of the arrow 141 between the end positions shown in FIGS. 13 and 16, 17 respectively.

As can be clearly seen from the drawings, the rotation of the arm 115 about 140 is controlled by the presence of two articulated telescopic tie bars 142, 143 which interconnect the arm 115 and the lever 116.

The tie bars 142, 143, the length of which is previously screw-adjustable, are pivoted together at 144, and are pivoted to the arm 115 and lever 116 at 145 and 146 respectively.

In correspondence with the pivotal axis 146 there is provided an input for motion originating from a geared motor unit indicated schematically by 147, which rotates the arm 115 about 140.

Operation of this further embodiment of the invention is apparent from FIGS. 13–19 and is briefly explained as follows.

At commencement of the cycle, the magnetized head 113 is in the position shown in FIG. 13, below a second layer 112a of sections lying on the transport line 129, a first layer 112 of sections being in an advanced position ready to receive the second layer 112a thereon. The magnetized head 113 (driven in the manner already described with reference to FIGS. 1–12) is raised into the position shown in FIG. 14, so as to withdraw the second layer 112a of sections from the transport line 129. After this the head 113 is overturned through about 180° (by counter-clockwise rotation) into the position shown in FIG. 15, so as to bring the second layer 112a of sections into correspondence with and above the first layer 112.

Figure 14:
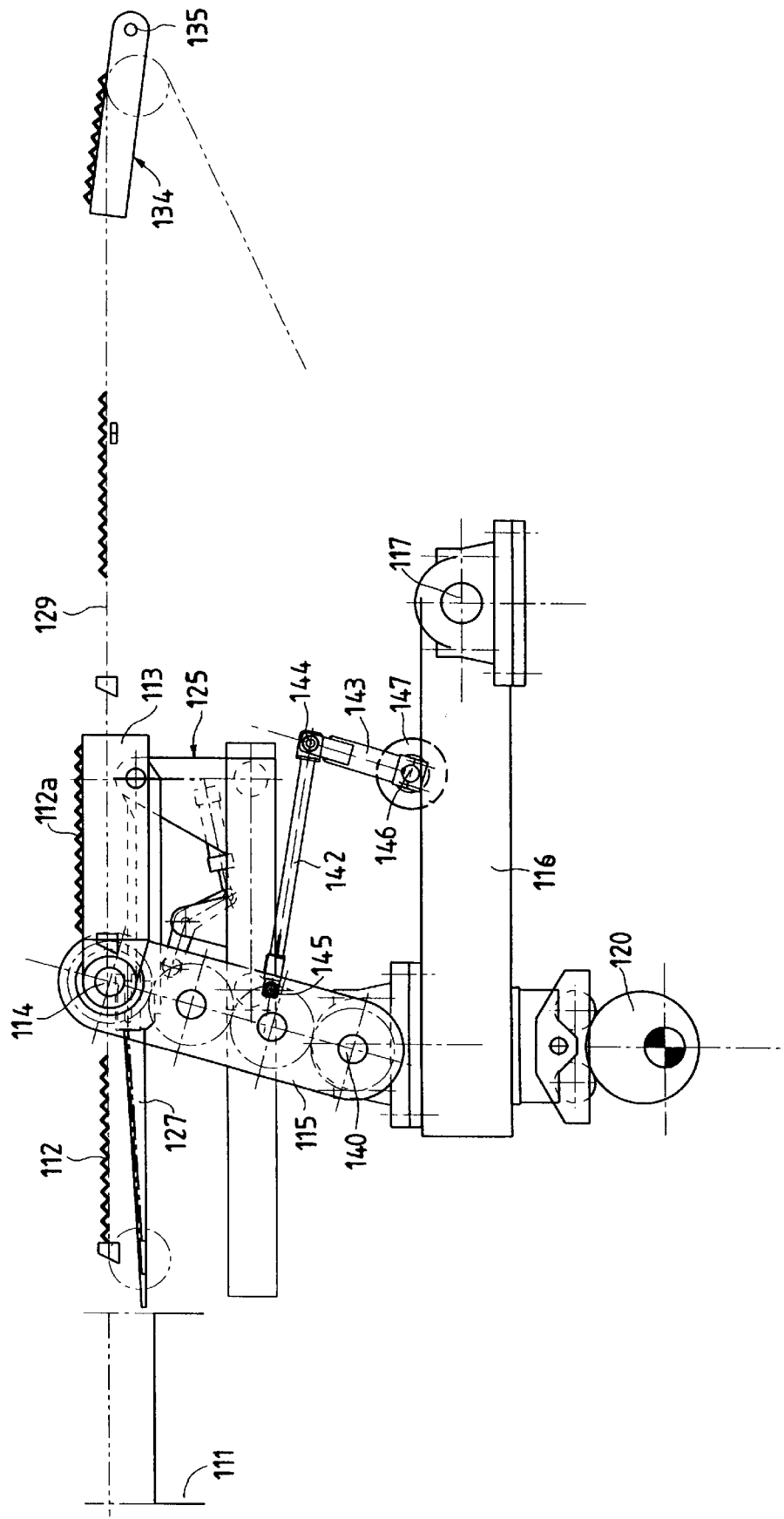
Figure 15:
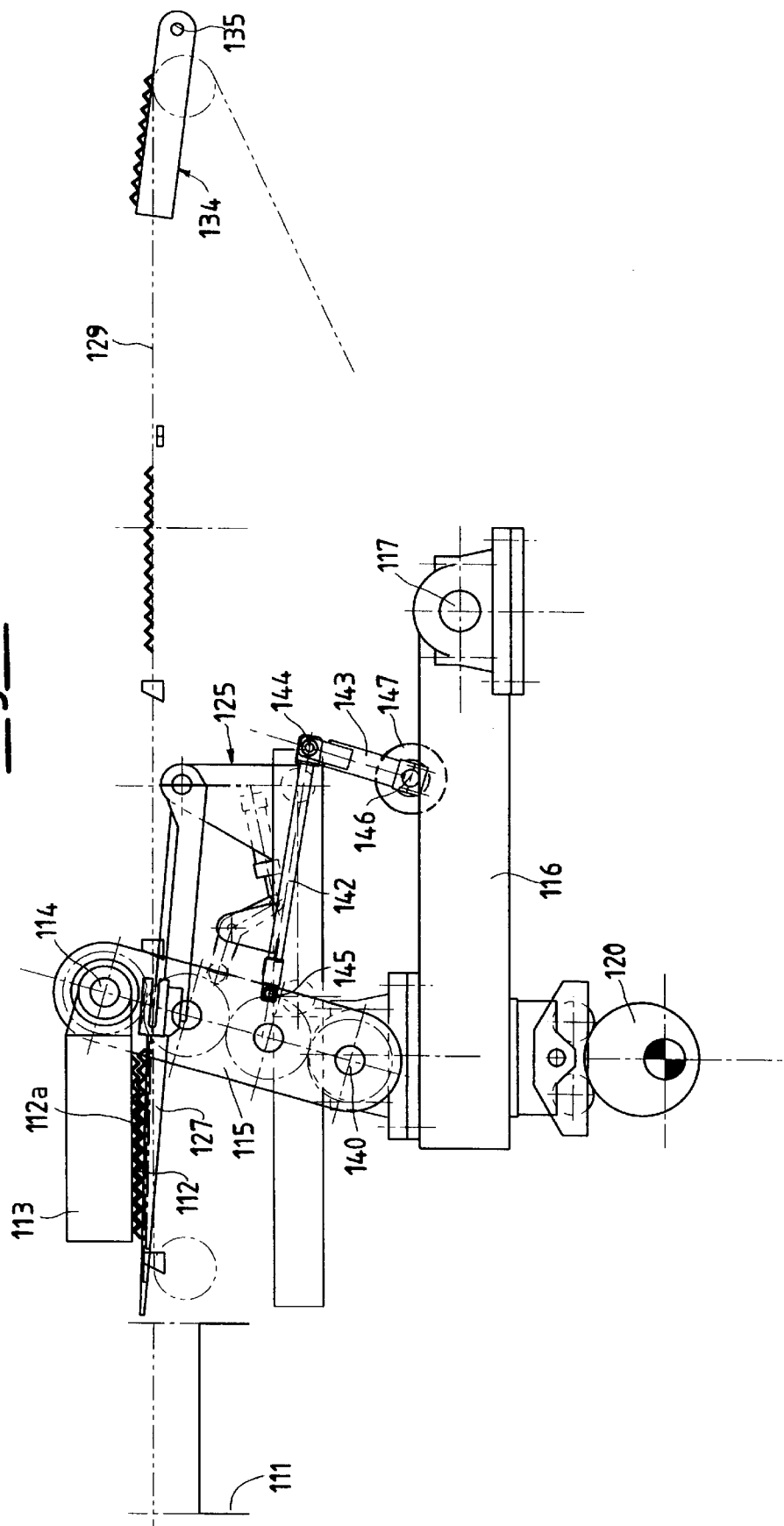

In this stage the lance 127 is raised from the position shown in FIG. 14 to the position shown in FIG. 15, so as to withdraw the first layer 112 of sections from the transport line 129 and nest it onto the second layer 112a of sections carried by the magnetized head 113.

In this manner the two layers 112, 112a of sections are perfectly nested, clamped between the lance 127 and the magnetized head 113, which carries them both.

The lance 127 can now be lowered into the position shown in FIG. 16 and the magnetized head 113, carrying both the layers 112, 112a of sections, is moved into correspondence with the descending platform 111 (by operating the geared motor unit 147 and via use of the articulated tie bars 142, 143).

Figure 18:
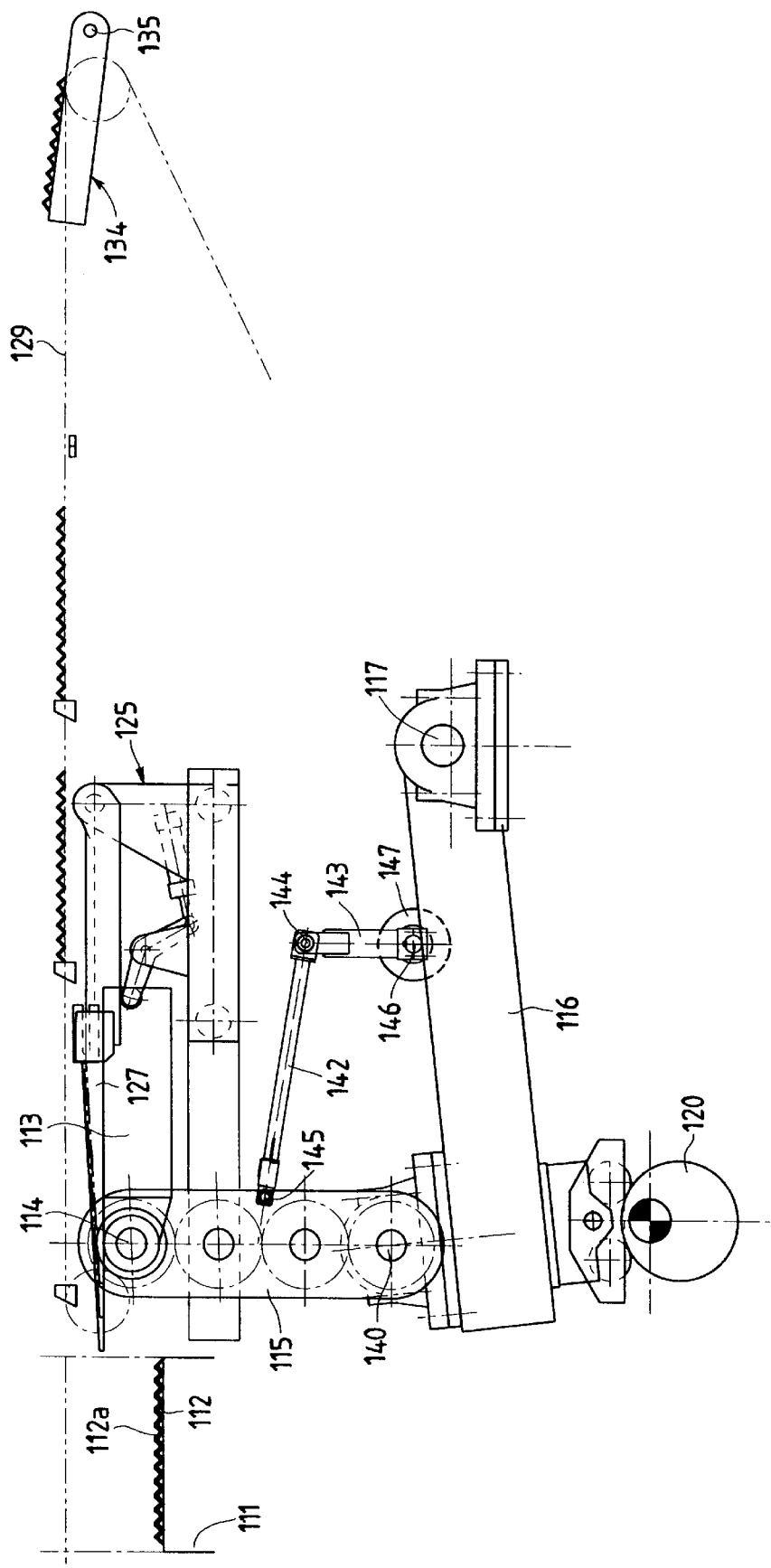

From the position shown in FIG. 16 the head 113 is lowered into the position shown in FIG. 17 and demagnetized, so as to deposit the two superposed layers 112, 112a of sections onto the descending platform 111, after which the system is returned to its initial position by overturning the head 113 into the position shown in FIG. 18, moving it into the position shown in FIG. 19 and advancing two further successive layers of sections through one step so that they lie above the lance 127 and above said head 113 respectively.

The system is hence ready for a further cycle for transporting two superposed layers of sections onto the descending platform 11 in the manner already described.

The objects stated in the introduction to the description, of providing a stacker of small size, with a very simple and hence economical drive system for the magnetic heads, in which the section layers are deposited softly and rapidly with precision, one on the other on the top of the descending platform.

Obviously, numerous modifications and variations of the present invention are possible in light of the above teachings. It is therefore to be understood that within the scope of the appended claims, the invention may be practiced otherwise than as specifically described herein.

I claim:

1. An automatic stacker with rotary heads for stacking in an ordered manner in alternate upright and inverted layers rolled metal sections originating from a rolling mill via a transport line which comprises:

a plurality of carriages having lances movable forwards and rearwards from a region in which said lances receive a first layer of sections to a region in which the layer of sections are deposited in an upright position, and a plurality of magnetic heads rotatable by a first drive mechanism from a position in which said heads withdraw a second layer of sections to a position in which the second layer of sections are inverted on the first layer of upright sections, wherein each head also undergoes a vertical translational movement during which the orientation of each head remains substantially unchanged, a second drive mechanism generating said translational movement independent of the first drive mechanism, wherein said first drive mechanism comprises a plurality of mutually engaged gearwheels driven by a geared motor unit.

2. A stacker as claimed in claim 1, wherein said second drive mechanism comprises a lever carrying said head, said lever being rotatable by a cam.

3. A stacker as claimed in claim 2, wherein said head is mounted on an arm extending at one end of said lever, which at an opposite end thereof is pivotable to a support.

4. A stacker as claimed in claim 2, wherein said cam causes the lever to rotate via a cam follower mounted on the lever at a position below a vertically extending arm carrying at a free end said head.

5. A stacker as claimed in claim 4, wherein said arm carries said first drive mechanism for rotating the head.

6. A stacker as claimed in claim 3, wherein said arm is pivotably connected to the lever so as to move said head between a first position in which the head is positioned below said second layer of sections, and a second position in which the head is positioned above a descending platform.

7. A stacker as claimed in claim 6, wherein the arm and lever are interconnected by two tie bars pivotably connected together, and pivotably connected to said arm and lever, and an input member for causing the arm to rotate about a pivot axis.

* * * * *